US009885560B2

(12) United States Patent
Bridges

(10) Patent No.: US 9,885,560 B2
(45) Date of Patent: Feb. 6, 2018

(54) LENGTH ARTIFACT AND METHOD OF MEASUREMENT

(71) Applicant: FARO TECHNOLOGIES, INC., Lake Mary, FL (US)

(72) Inventor: Robert E. Bridges, Kennett Square, PA (US)

(73) Assignee: FARO TECHNOLOGIES, INC., Lake Mary, FL (US)

(*) Notice: Subject to any disclaimer, the term of this patent is extended or adjusted under 35 U.S.C. 154(b) by 0 days.

(21) Appl. No.: 15/471,063

(22) Filed: Mar. 28, 2017

(65) Prior Publication Data
US 2017/0199025 A1 Jul. 13, 2017

Related U.S. Application Data

(63) Continuation of application No. 14/662,450, filed on Mar. 19, 2015, now Pat. No. 9,612,107.

(60) Provisional application No. 62/010,043, filed on Jun. 10, 2014.

(51) Int. Cl.
*G01B 11/00* (2006.01)
*G01B 11/14* (2006.01)
*G01S 3/786* (2006.01)
*G01B 21/04* (2006.01)
*G01B 11/24* (2006.01)

(52) U.S. Cl.
CPC ............ *G01B 11/005* (2013.01); *G01B 11/14* (2013.01); *G01B 21/042* (2013.01); *G01S 3/786* (2013.01); *G01B 11/00* (2013.01); *G01B 11/24* (2013.01)

(58) Field of Classification Search
CPC ..... G01B 11/005; G01B 11/00; G01B 21/042; G01B 11/24; G01B 21/04; G01B 11/14; G01S 3/786
USPC .................. 33/502–503, 556, 558–559, 561, 33/568–570, 573, 702–704, 1 M
See application file for complete search history.

(56) References Cited

U.S. PATENT DOCUMENTS

| 4,932,136 | A | 6/1990 | Schmitz et al. |
| 5,189,807 | A | 3/1993 | Gustafsson |
| 5,430,948 | A | 7/1995 | Vander Wal, III |
| 6,964,113 | B2 | 11/2005 | Bridges et al. |
| 8,051,575 | B2 | 11/2011 | Bridges et al. |
| 8,232,793 | B2 | 8/2012 | Weidmann et al. |
| 8,479,406 | B2 | 7/2013 | Brunson |
| 9,021,853 | B1 * | 5/2015 | Gleason ............... G01B 21/042 73/1.01 |
| 9,188,430 | B2 | 11/2015 | Atwell et al. |
| 9,575,163 | B2 * | 2/2017 | Hudlemeyer ........... G01S 7/497 |
| 2002/0148133 | A1 * | 10/2002 | Bridges ................ G01B 5/0014 33/702 |
| 2008/0295352 | A1 | 12/2008 | Brunson |
| 2015/0354942 | A1 | 12/2015 | Bridges |

\* cited by examiner

*Primary Examiner* — R. A. Smith
*Assistant Examiner* — Tania Courson
(74) *Attorney, Agent, or Firm* — Cantor Colburn LLP

(57) ABSTRACT

A length artifact has a first side wall, a second side wall, and a base portion, the first side wall and the second side wall separated by an air gap at least four millimeters wide, the base portion being attached to a bottom of the first side wall and the second side wall, the base portion further having a first platform region that includes a first nest and a second platform region that includes a second nest, the first nest and the second nest configured to accept a spherical surface of a retroreflector target.

13 Claims, 9 Drawing Sheets

PERSPECTIVE VIEW

NEST-SMR DETAIL

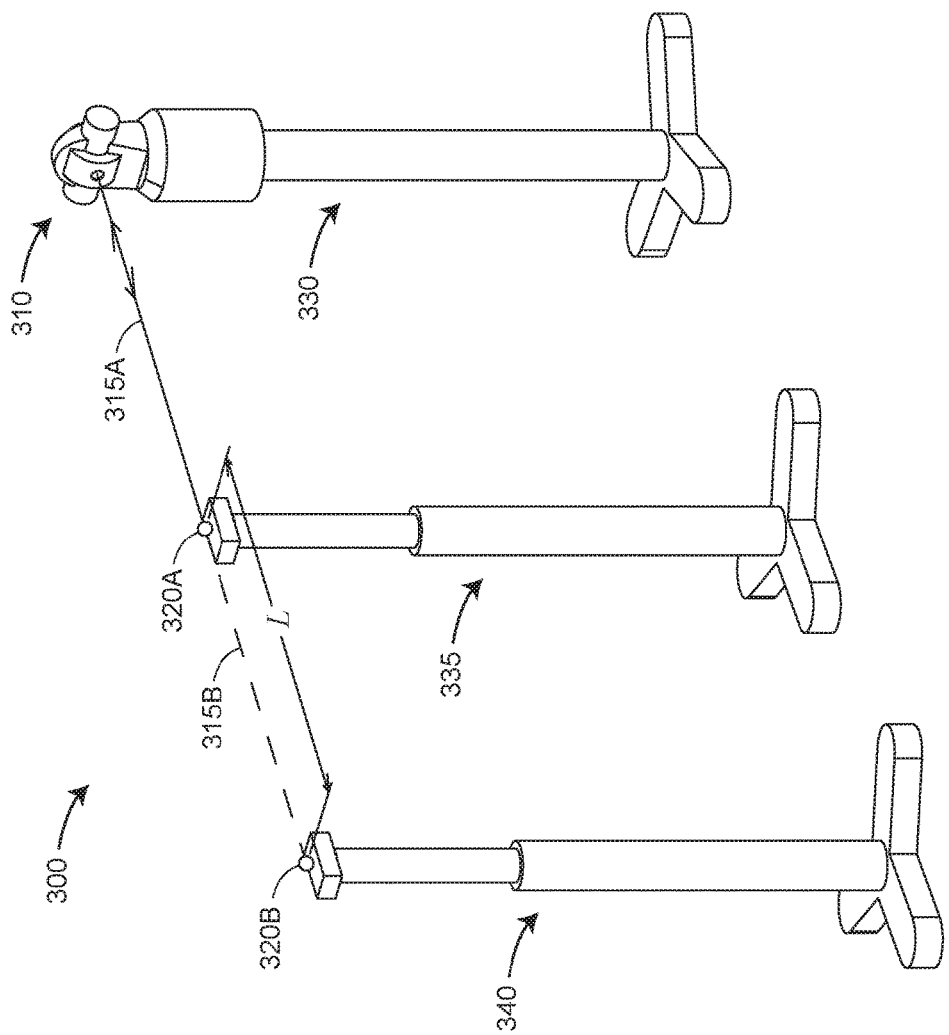

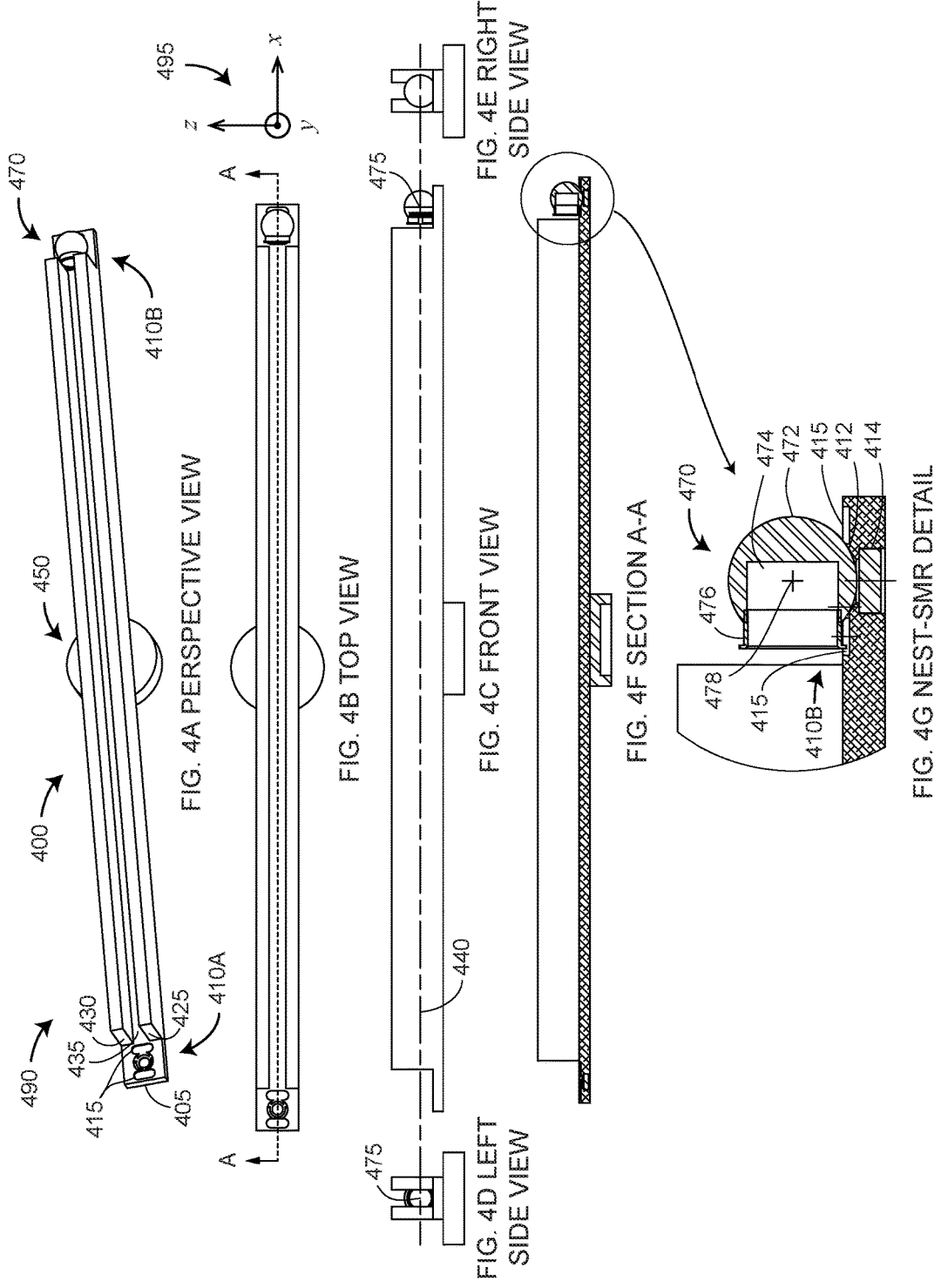

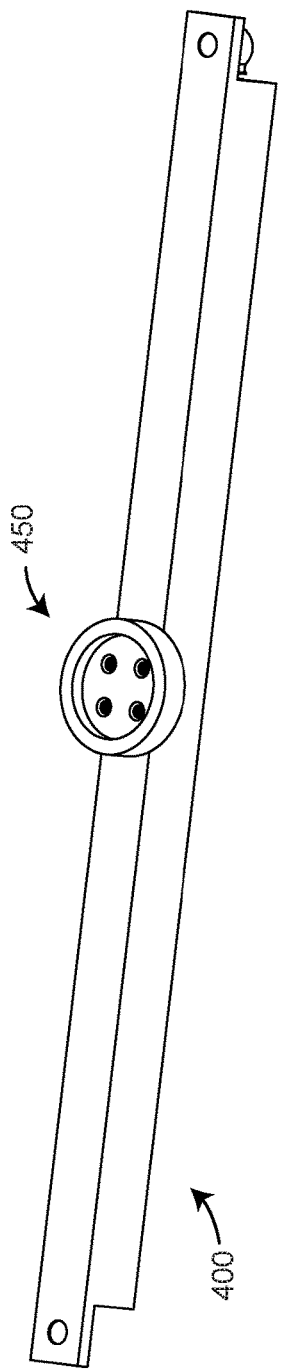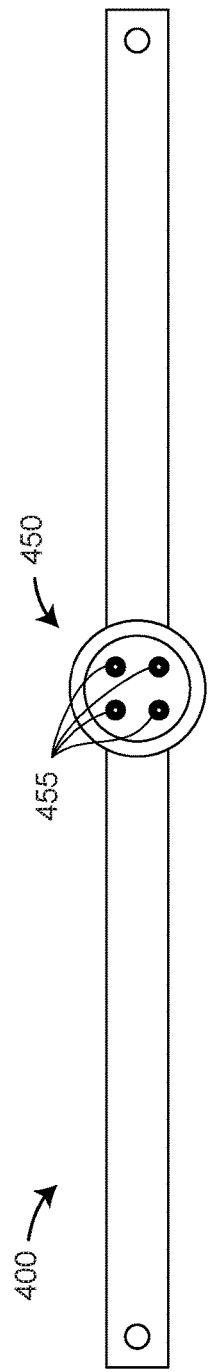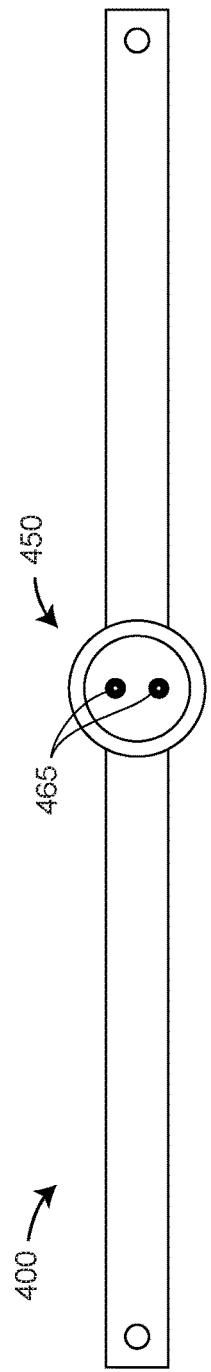

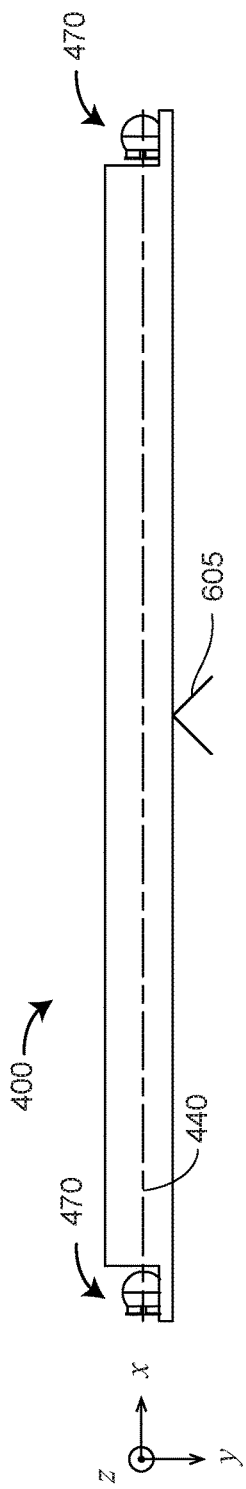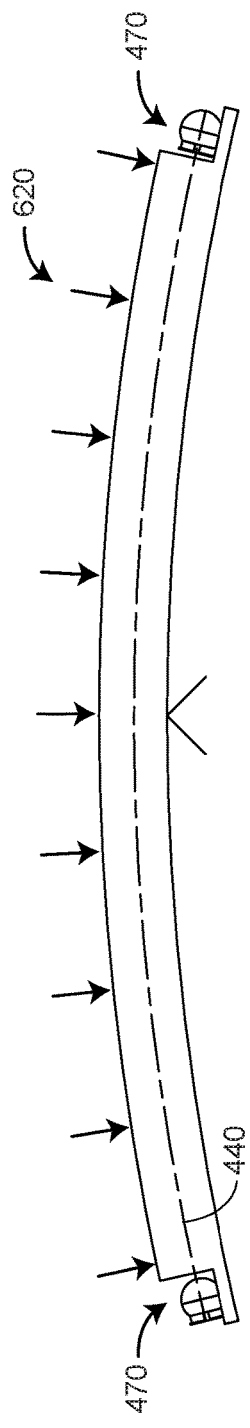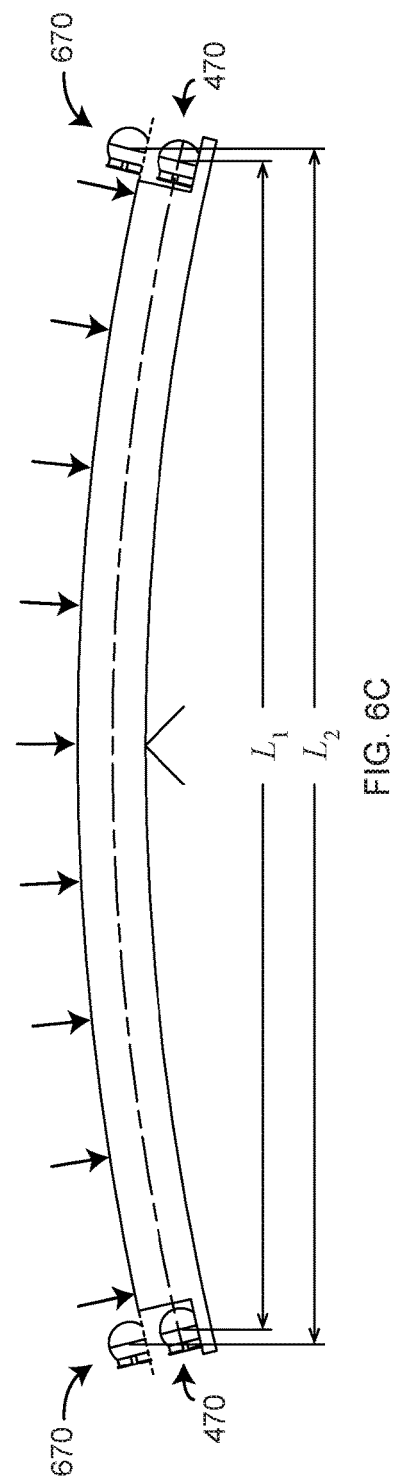

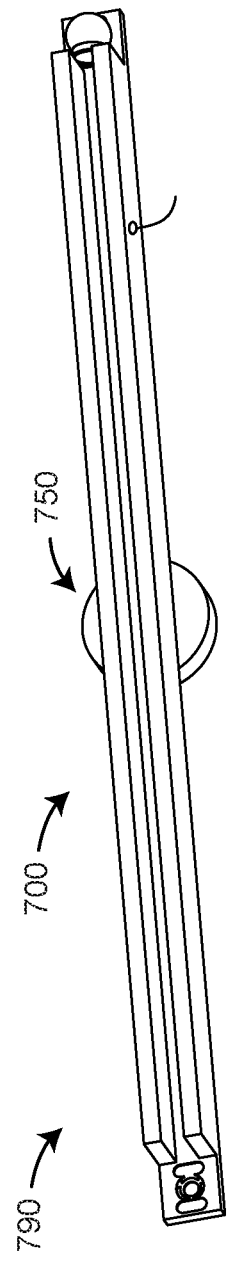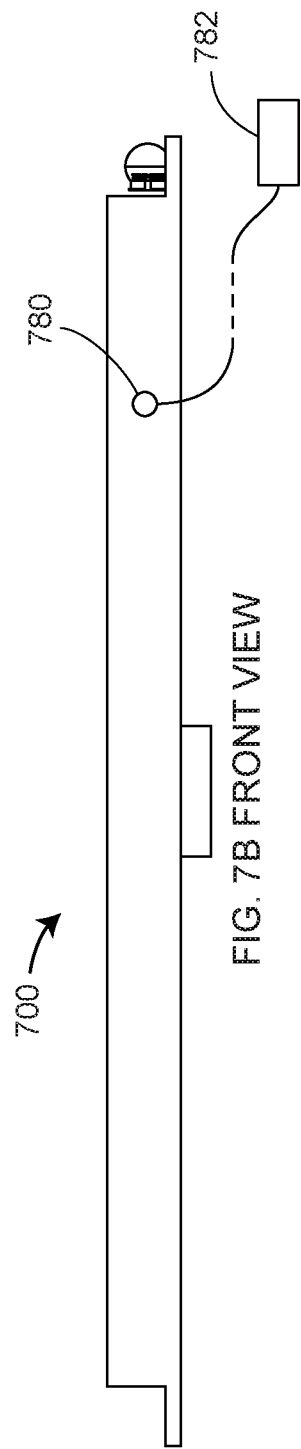

LENGTH ARTIFACT AND METHOD OF MEASUREMENT

CROSS-REFERENCE TO RELATED APPLICATIONS

The present application is a continuation of and claims the benefit of U.S. Non-Provisional patent application Ser. No. 14/662,450, filed Mar. 19, 2015, and U.S. Provisional Patent Application No. 62/010,043, filed Jun. 10, 2014, the contents of both of which are incorporated by reference herein.

BACKGROUND OF THE INVENTION

The present disclosure relates to a length artifact to determine the measurement errors associated with a three-dimensional (3D) measurement instrument and with methods of measurement using the length artifact.

Portable metrology instruments, such as portable laser trackers and articulated arm coordinate measuring machines (AACMMs), find widespread use in the manufacturing or production of parts where there is a need to rapidly and accurately verify the dimensions of the parts during various stages of the manufacturing or production (e.g., machining). Portable metrology instruments represent an improvement over known stationary or fixed, cost-intensive and relatively difficult to use measurement installations, particularly in the amount of time it takes to perform dimensional measurements of relatively complex parts.

A laser tracker is in a class of instruments that measure coordinates of a point by sending a beam of light to the point. The beam of light may impinge on a retroreflector target in contact with the point. The laser tracker determines the coordinates of the point by measuring the distance and the two angles to the target. The distance is measured with a distance-measuring device such as an absolute distance meter (ADM) or an interferometer. The angles are measured with an angle-measuring device such as an angular encoder. A gimbaled beam-steering mechanism within the instrument directs the laser beam to the point of interest. A related instrument is a total station (tachymeter) that measures to either a retroreflector or a point on a diffusely scattering surface. Laser trackers, which typically have accuracies on the order of a thousandth of an inch and as good as one or two micrometers under certain circumstances, are usually much more accurate than total stations. The broad definition of laser tracker, which includes total stations, is used through this application.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

Periodically it is desirable to evaluate the performance of a 3D measuring instrument. One way to do this is to measure a length artifact, also known as a length standard or a reference length, and to compare a length of the artifact as obtained from a calibration to the length as obtained from a measurement with the 3D measuring instrument. The difference between the measured and calibrated length values is the error, which is an indicator of performance of the 3D measuring instrument. Today, there is a need for a length artifact that is stable, easily calibrated, and easily measured with a 3D measuring instrument such as a laser tracker, articulated arm CMM, or similar device.

Accordingly, while existing length artifacts are suitable for their intended purposes, the need for improvement remains, particularly in providing an improved length artifact and method of measuring with a 3D measuring device.

BRIEF DESCRIPTION OF THE INVENTION

In accordance with an embodiment, a length artifact is provided, the length artifact having an artifact frame of reference, the length artifact including a first side wall and a second side wall, the first side wall and the second side wall separated by an air gap, the air gap being at least four millimeters wide, the first side wall having a first bottom surface, a first left surface, and a first right surface, the second side wall having a second bottom surface, a second left surface, and a second right surface; and a base portion in contact with the first bottom surface and the second bottom surface, the base portion having a first platform region and a second platform region, the first platform region extending beyond the first left surface and the second left surface, the second platform region extending beyond the first right surface and the second right surface, the first platform region including a first nest, the first nest configured to accept a spherical surface of a retroreflector target, the spherical surface having a sphere center, the second platform region including a second nest, the second nest configured to accept the spherical surface of the retroreflector target, the length artifact further including a first nest center and a second nest center, the first nest center being first three-dimensional (3D) coordinates in the artifact frame of reference of the sphere center when the retroreflector target is placed in the first nest, the second nest center being second 3D coordinates in the artifact frame of reference of the sphere center when the retroreflector target is placed in the second nest, the length artifact further having a neutral surface in the artifact frame of reference, the neutral surface being a surface above which the length artifact is in tension and below which the length artifact is in compression in accordance with an embodiment.

In accordance with another embodiment, a method of calibrating a length artifact is provided, the method including providing a retroreflector target configured to retroreflect a beam of light, the retroreflector target having a spherical portion, the spherical portion having a sphere center; providing the length artifact, the length artifact having a first side wall, a second side wall, and a base portion, the first side wall and the second side wall separated by an air gap, a bottom portion of the first side wall and a bottom portion of the second side wall in contact with the base portion, the base portion including a first nest and a second nest, the first nest configured to accept the spherical portion when the sphere center is at a first nest center, the second nest configured to accept the spherical portion when the sphere center is at a second nest center; providing a laser tracker, the laser tracker configured to project a beam of light to the retroreflector target, to track the retroreflector target, and to determine three-dimensional (3D) coordinates of the retroreflector target, the 3D coordinates based at least in part on a distance from the laser tracker to the retroreflector target, the distance determined by a distance meter within the laser tracker, the distance based at least in part on a speed of light in air; aligning the beam of light with the first nest center and the second nest center; placing the retroreflector target in the first nest; sending the beam of light to the retroreflector target; measuring with the laser tracker a first distance to the first nest center; placing the retroreflector target in the second nest; sending the beam of light through the air gap between the first side wall and the second side wall to the retroreflector target; measuring with the laser tracker a second distance to the second nest center; and determining a first artifact length based at least in part on the first distance and the second distance These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a perspective view of a prior art method for establishing a reference length;

FIGS. 4A-G are views of a length artifact: perspective, top, front, left side, right side, section, and nest-SMR detail, respectively, in accordance with an embodiment of the invention;

FIGS. 5A-C are views of a mount according to embodiments;

FIGS. 6A-C are schematic illustrations of the effect of retroreflector target placement on a length artifact;

FIGS. 7A and 7B are perspective and side views, respectively, of an artifact that includes a temperature sensor.

The detailed description explains embodiments of the invention, together with advantages and features, by way of example with reference to the drawings.

DETAILED DESCRIPTION OF THE INVENTION

An embodiment of the present invention provides a length artifact having features that provide convenience, stability, and accuracy in the evaluation of the performance of 3D measuring devices such as laser trackers and articulated arm CMMs.

Figure 1A:
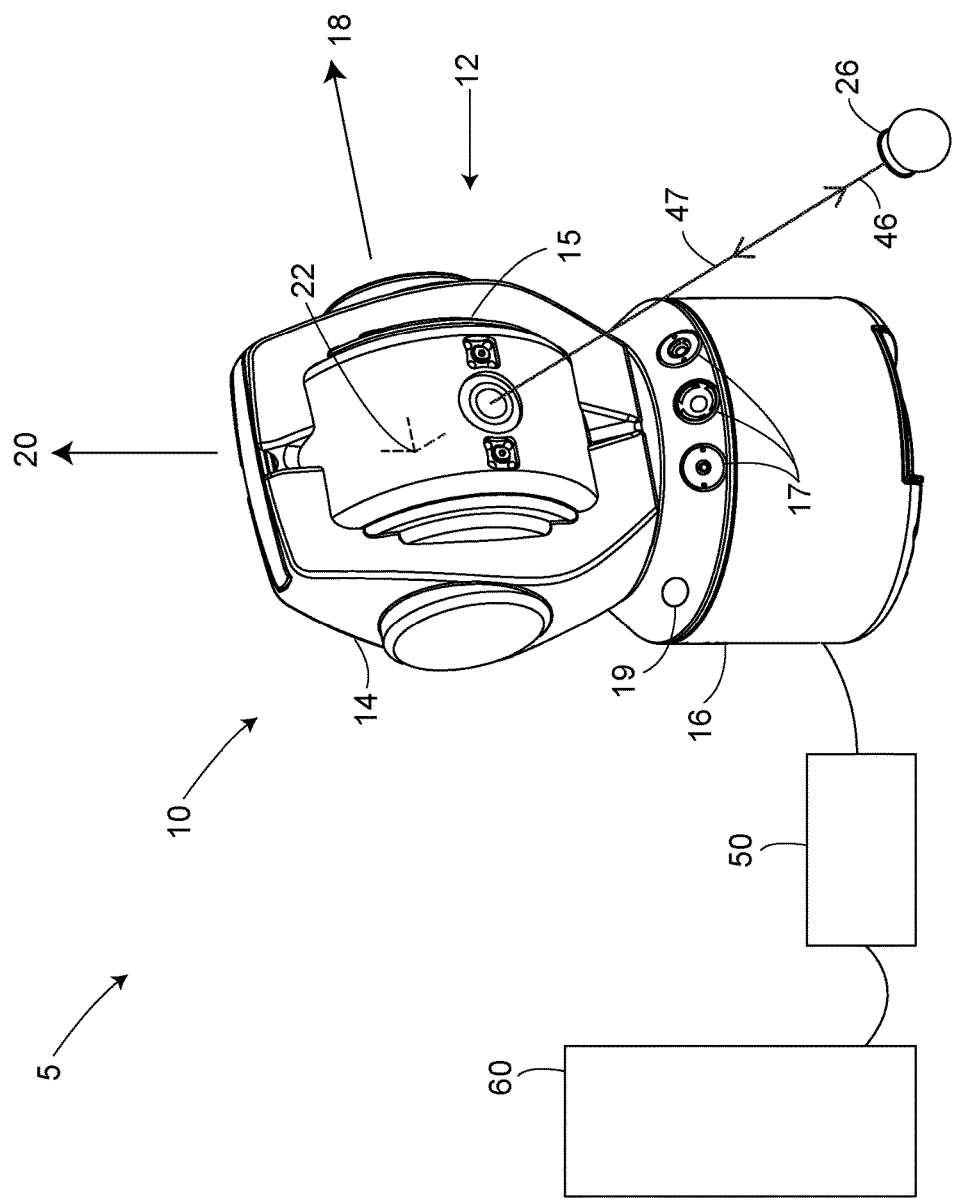
FIG. 1A is a perspective view of a laser tracker in accordance with an embodiment of the invention.

An exemplary laser tracker system 5 illustrated in FIG. 1A includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a surface (plane) approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Figure 1B:
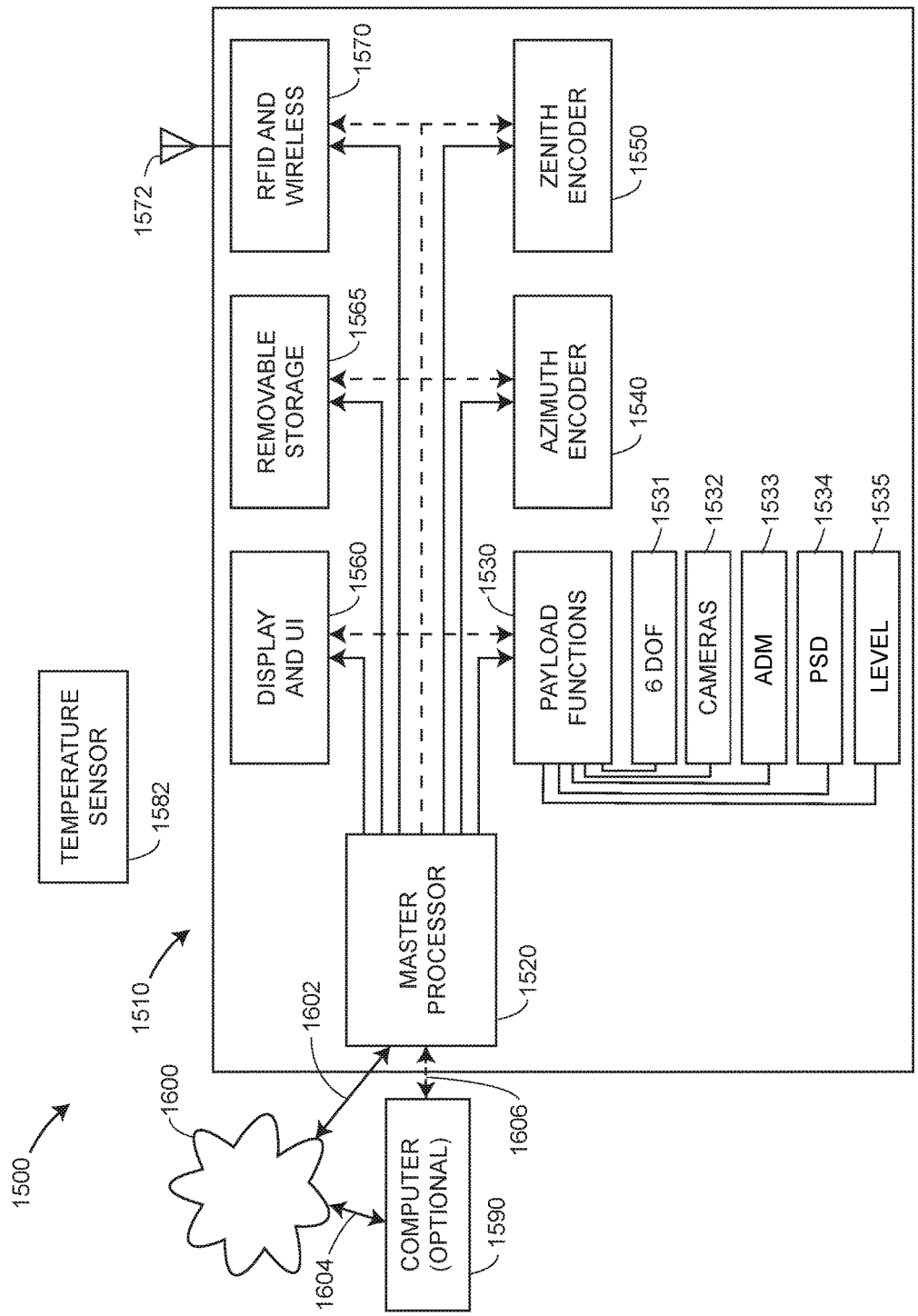
FIG. 1B is a block diagram showing elements of tracker electronics in accordance with an embodiment of the invention.

FIG. 1B is a block diagram depicting a dimensional measurement electronics processing system 1500 that includes a laser tracker electronics processing system 1510, processing system of a temperature sensor peripheral 1582, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics 1570, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535.

Figure 2:
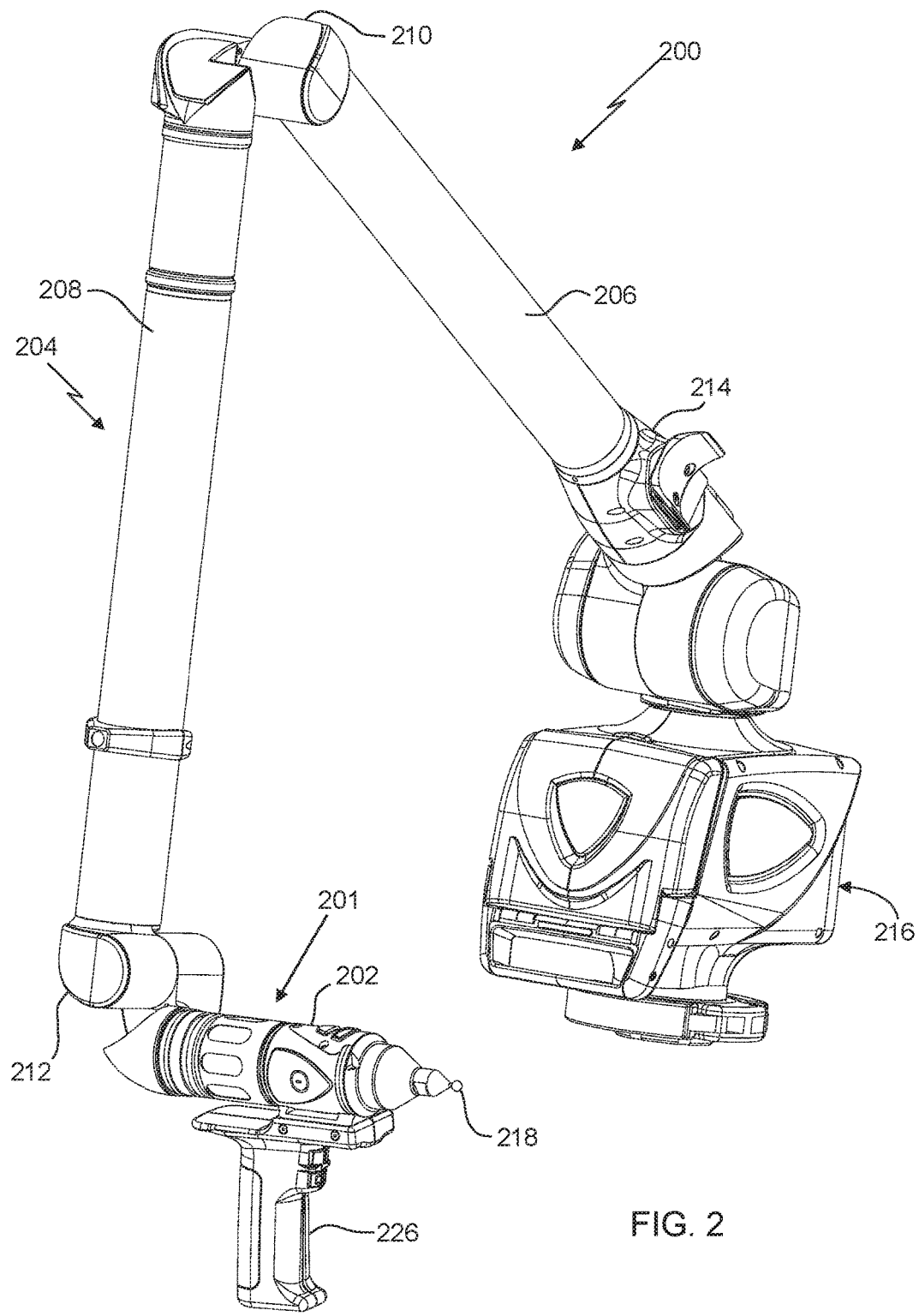
FIG. 2 is a perspective view of a portable articulated arm coordinate measuring machine (AACMM) in accordance with an embodiment of the invention.

FIG. 2 shows an exemplary AACMM 200 that may comprise a six or seven axis articulated measurement device having a probe end 201 that includes a measurement probe housing 202 coupled to an arm portion 204 of the AACMM 200 at one end. The arm portion 204 comprises a first arm segment 206 coupled to a second arm segment 208 by a rotational connection having a first grouping of bearing cartridges 210 (e.g., two bearing cartridges). A second grouping of bearing cartridges 212 (e.g., two bearing cartridges) couples the second arm segment 208 to the measurement probe housing 202. A third grouping of bearing cartridges 214 (e.g., three bearing cartridges) couples the first arm segment 206 to a base 216 located at the other end of the arm portion 204 of the AACMM 200. Each grouping of bearing cartridges 210, 212, 214 provides for multiple axes of articulated movement. Also, the probe end 201 may include a measurement probe housing 202 that comprises the shaft of the seventh axis portion of the AACMM 200 (e.g., a cartridge containing an encoder system that determines movement of the measurement device, for example a contact probe tip 218, in the seventh axis of the AACMM 100). In this embodiment, the probe end 201 may rotate about an axis extending through the center of measurement probe housing 202. In use the base 216 is typically affixed to a work surface.

Each bearing cartridge within each bearing cartridge grouping 210, 212, 214 typically contains an encoder system (e.g., an optical angular encoder system). The encoder system (i.e., transducer) provides an indication of the position of the respective arm segments 206, 208 and corresponding bearing cartridge groupings 210, 212, 214 that all together provide an indication of the position of the probe 218 with respect to the base 216 (and, thus, the position of the object being measured by the AACMM 100 in a certain frame of reference—for example a local or global frame of reference).

The probe tip 218 is detachably mounted to the measurement probe housing 202, which is connected to bearing cartridge grouping 212. In exemplary embodiments, the probe housing 202 houses a removable probe tip 218. In other embodiments, the measurement is performed, for example, by a non-contacting device such as a laser line probe (LLP). In an embodiment, the handle 226 is replaced with the LLP using the quick-connect interface. Other types of accessory devices may replace the removable handle 226 to provide additional functionality.

In accordance with an embodiment, the base 216 of the portable AACMM 200 contains or houses an electronic data processing system that includes a base processing system that processes the data from the various encoder systems within the AACMM 200 as well as data representing other arm parameters to support 3D positional calculations. An electronic data processing system in the base 216 may communicate with the encoder systems, sensors, and other peripheral hardware located away from the base 216 (e.g., a LLP that can be mounted to or within the removable handle 226 on the AACMM 200). The electronics that support these peripheral hardware devices or features may be located in each of the bearing cartridge groupings 210, 212, 214 located within the portable AACMM 200.

FIG. 3 shows a prior art method for establishing a reference length L between a retroreflector target in a first position 320A and a second position 320B. The laser tracker 310 includes a calibrated distance meter such as an interferometer or ADM. For this measurement of a length L between two points, an appropriately calibrated laser tracker may have metrological traceability whereby the result of the measured length can be related to stated references, usually national or international standards, through an unbroken chain of comparisons all having stated uncertainties. The error in the measured length L of the reference artifact is minimized by aligning the beam of light 315A from the laser tracker 310 to the positions 320A, 320B of the retroreflector target. The reason for the reduced error is that the length L is determined based only on the readings of the distance meter and not only the angle readings of the tracker 310, which are less accurate.

The retroreflector target may be an SMR similar to element 26 of FIG. 1A. An SMR, which has a spherically shaped outer portion surface, may be repeatably placed in a suitable nest. An example of a nest that may provide repeatable positioning for the spherically shaped outer portion of an SMR is a nest that includes three small spheres spaced apart by 120 degrees. The larger spherical surface of the SMR makes contact at the same points on the three spheres regardless of how the sphere is rotated. The vertex of an open-air cube corner retroreflector is adjusted to coincide with the center of the sphere so that the vertex also remains at a fixed location as the SMR is rotated in the nest. By this means, the center of the SMR may be repeatably measured at positions 320A, 320B, thereby enabling repeatable determination of the length L. The nests at positions 320A, 320B are placed on instrument stands 335, 340, respectively. The positions 320A, 320B correspond to the centers of the retroreflector when placed on the nests of the stands 335, 340, respectively. The beam of light 315A is sent from the tracker 310 on the instrument stand 330 to the retroreflector at position 320A. The beam of light returns to the tracker 310 along the same beam path. The retroreflector is moved to the second position 320B and the beam of light 315B is sent to and returns from the retroreflector in the new position.

After a reference length L has been determined in calibration laboratory according to the arrangement of FIG. 3, other measuring instruments may be tested using the test setup 300 to evaluate their performance (determine their measurement errors). 3D instruments under test may be placed in a variety of positions relative to the positions 320A, 320B. For example, a laser tracker may be placed to the side of the instrument stands so as to use its angular measuring capability in addition to its distance measuring capability. In this way, the performance of the tracker may be determined for a variety of measurement conditions.

The method of establishing a reference length L shown in FIG. 3 is suited to a relatively permanent installation. It is less well suited to a quick check of the performance of a 3D instrument, especially if there is a need to test instrument performance in a variety of locations. For this purpose, it is preferable to provide a physical artifact having a reference length rather than the arrangement of FIG. 3. It is desirable that such a physical artifact have metrological traceability as described above.

A common (prior art) physical artifact having a reference length is a ballbar. A ballbar includes a sphere attached to and centered on each end of cylindrical shaft. The distance between the centers of the two spheres is measured in a calibration laboratory to provide a traceable reference length. The performance of a 3D instrument is established by measuring the length between the two spheres. The reference length is subtracted from the length measured by the 3D instrument to obtain an error. This error is compared to a maximum permissible error (MPE) given in a data sheet provided by the manufacturer of the 3D instrument. By comparing the observed error to the specified MPE value, the instrument is found to be within the manufacturer's specifications or outside the manufacturer's specifications.

The 3D instrument under test determines the distance between the ballbar sphere centers by measuring the 3D coordinates of the sphere surface at a number of positions on the surface. This data is used in a mathematical optimization procedure to obtain a best-fit sphere having a sphere center. The 3D coordinates of the centers of the two best-fit spheres at the positions 320A, 320B are used to find the ballbar length.

A practical difficulty in using a ballbar to determine the performance of a laser tracker is that it is difficult to obtain an acceptable sample of 3D coordinates for the sphere farthest from the tracker. In other words, suppose the spheres of a ball bar were located in the positions 320A and 320B of FIG. 3 (with the ballbar cylindrical shaft connecting the two spheres). If the laser tracker were aligned to the ballbar spheres as in FIG. 3, it would be difficult or impossible for the tracker 310 to measure 3D coordinates of the near and far sides of the farthest ballbar sphere (at the position 320B). The portion of the farthest sphere nearest the tracker is obscured by the cylindrical shaft of the ballbar. The portion of the farthest sphere that is farthest from the tracker cannot be contacted with the tracker SMR without pointing the retroreflector away from the beam 315B, thereby breaking the beam. Therefore, for the farthest sphere in the ballbar, points can only be collected for the sphere central region, decreasing the ability to accurately fit the collected data to a sphere. This has the undesirable consequence of increasing the uncertainty in the tracker measurement.

Another practical difficulty in using a ballbar to measure devices such as laser trackers or AACMMs is that the ballbar needs to be mounted at two positions, ordinarily underneath the two spheres. As in the case of the arrangement shown in FIG. 3, ballbars are more suited to permanent, rather than flexible or impromptu, measurements of instrument performance. Another disadvantage of using a ballbar is that multiple points must be measured and a best-fit procedure carried out.

Another prior art method for establishing a reference length to verify the performance of a laser tracker or AACMM is described in U.S. Pat. No. 8,051,575 ('575) to Bridges, et al., the contents of which are herein incorporated by reference. This patent describes a method in which a mount applied at two different positions along a length artifact may place the neutral surface of the mounted artifact to coincide with the SMR centers, thereby minimizing measurement error. An example of such a mounted artifact is shown in FIG. 3 of the '575 patent. This type of artifact and mounting arrangement is well suited to relatively large artifacts but is unnecessarily complex for measurements in which the length artifact can be mounted on a single structure or stand.

The mounted length artifact 490 described by FIGS. 4A-G overcome the limitations of the prior art methods described hereinabove. The mounted length artifact 490 includes a length artifact 400, which is optionally attached to a mount 450. The length artifact 400 includes a base portion 405 that extends the length of the artifact. Attached to the base portion 405 are a first sidewall 425 and a second sidewall 430. Between the first sidewall and the second sidewall is an air gap 435, the air gap being wide enough to permit passage of a beam of light from a laser tracker from one end of the artifact to the other end. In practice, this means that the air gap needs to be at least four millimeters wide. Each of the first sidewall and the second sidewall has a left surface as seen in FIG. 4D, a right surface as seen in FIG. 4E, and a bottom surface, which is in contact with the base portion 405. In the embodiment illustrated in FIG. 4, the base portion, first sidewall, and second sidewall are formed or machined from a single piece of material, but these three components could be fabricated separately.

The base portion has a first platform region and a second platform region, the first platform region extending beyond the left surfaces of the sidewalls and the second platform extending beyond the right surfaces of the sidewalls. The first platform includes a first nest 410A and the second platform includes a second nest 410B. In FIG. 4, an SMR 470 is shown placed on the second nest 410B. Each nest 410A, 410B includes contact points 412 that make contact with an outer spherical portion 472 of the SMR 470 to permit repeatable positioning of the SMR, usually to within one or two micrometers. A magnet 414 may be included in each of the nests 410A, 410B to securely hold the SMR in place. A cavity 474 in the SMR is sized to hold a cube-corner retroreflector (not shown), the cube corner having three perpendicular reflectors that form a cube-corner vertex. The SMR vertex coincides with the sphere center 478 of the spherical portion 472. The SMR 470 may include a collar 476 to simplify handling of the SMR by an operator. Recesses 415 may be placed to either side of the nests 410A, 410B to accommodate the collar 476.

The base portion 405, first sidewall 425, and second sidewall 430 may be formed from a single piece of material. In an embodiment, the material is a metal having a low coefficient of thermal expansion (CTE) to minimize changes in artifact length over temperature. Examples of low CTE material are Invar (CTE from 0.5 to 2 µm/m/T) and Super Invar (CTE from 0.3 to 1 µm/m/° C.). In another embodiment, the material is a non-metal having a low CTE. An example of such a material is a carbon-fiber composite, which may have a CTE less than 1 µm/m/° C. Other low CTE materials include certain ceramics and glasses. In other embodiments, the artifact 400 is made of material that does not have a low CTE. Examples of such materials include steel (CTE approximately 11.5 µm/m/° C.) and aluminum (CTE approximately 23 µm/m/° C.).

In an embodiment, the height and thickness of the first sidewall 425 and second sidewall 430 are selected relative to the height and width of the base portion 405 so as to make the neutral plane (surface) 440 of the artifact 400 coincide with the center 478 of the SMR 475 when placed in the nests 410A, 410B. This coincidence is shown in FIGS. 4C-E. A length artifact 400 has an artifact frame of reference 495 that is tied to the artifact. Suppose that the gravity vector in FIG. 6 is along the y direction as shown in FIG. 6. Then the neutral surface is found by taking the first moment of y over the mass of the structure. The length artifact 400 of FIG. 6 is made of homogeneous material and has most of the weight concentrated in the central portion that includes the first and second sidewalls 425, 430. In this case, the neutral axis to a good approximation passes through the centroid of a cross section of the length artifact 400 in a part of the artifact that includes the side walls. The neutral plane 440 passes through the neutral axis and lies in the x-z plane.

In FIG. 4, the mount 450 attaches to the center of the artifact 400. In one embodiment, the mount 450 screws onto an instrument stand. In an embodiment shown in FIGS. 5A, 5B, the mount 450 attaches to the length artifact 400 with four screws 455. In another embodiment, a mount 450 attaches to the length artifact 400 with two screws 465 as shown in FIG. 5C. Because the screws in either FIG. 5B or FIG. 5C are relatively close together, the support provided by the mount 450 can be modeled as a single point 605 as shown in FIG. 6.

The distributed forces of gravity 620 of FIG. 6B cause the length artifact 400 to bend along a slight arc. Hence the neutral plane is actually a neutral surface. The portion of the length artifact above the neutral surface is in tension and the portion of the length artifact below the neutral surface is in compression. The reference length L of the length artifact 400 is determined along the x direction shown in FIG. 6. The gravity-induced angles of bending of the test artifact are small relative to the x direction and hence, for the case of the SMR 470 placed on the neutral surface in the nests 410A, 410B, the error in the measured length is just proportional to a cosine of the angle, which is a negligible error. In other words, in FIG. 6, the measured distance for the SMR 470 placed on the nests 410A, 410B is $L_1$, which is very nearly equal to the true length L. On the other hand, if the SMR 470 were placed on the upper surface of a length artifact as for the SMR 670 in FIG. 6C, the angle of tilt of the SMR 670 would cause the distance between the SMR center at the two nests to be increased to a distance $L_2$. Even though the angle of tilt is not large, the center of the SMR along the x direction shifts by a distance equal to the sine of the angle times the distance of the SMR above the neutral plane, which can be a relatively large error. In other words, for a small angle of tilt θ, $\cos(\theta) \sim 1 - \theta^2/2$, which is nearly equal to 1, while for the same small angle, sin(θ)~θ, which in the situation described hereinabove is likely to be significantly larger than zero. By adjusting the neutral surface to coincide with the SMR centers, the error in the measured length is made negligible. By placing the SMR center off the neutral axis, the measured length may be significantly affected by gravity-induced bending.

The error caused by bending is particularly important when a relatively long artifact is supported by a single structure or stand. In this case, bending may be significant so that any changes in the test conditions can cause a relatively large change in the measured length. For example, an AACMM may be tested with a length artifact 400. For example, the nests may be configured to accept spherical surfaces having a diameter of ⅞ inch. The AACMM may be fitted with a ball probe having a diameter of ⅞ inch. By placing the AACMM ball probe in each nest and measuring the corresponding 3D coordinates in each case, the distance between the nest centers may be calculated. However, different operators may apply different amounts of force to the ball probe when putting it into the nest. An operator applying a greater amount of force will cause a greater amount of bending than would an operator applying a smaller amount of force. Hence, to obtain repeatable measurements using a length artifact 400, it is important that the neutral surface coincide as well as possible to the nest (ball probe) centers. Similarly, different SMRs, even of a given diameter, may have different weights depending on construction. These weight differences can changes in the amount of bending, resulting in different measured lengths if the SMR is measured with the SMR center off the neutral surface.

In some cases, it is desirable to use the same artifact on different types of mounts. For example, in one instance, it may be desirable to measure the artifact having a mount shown in FIG. 5C. In another instance, it may be desirable to remove the mount 450 and clamp the length artifact 400 to a granite table. For SMRs (or ball probes) placed in nests so as to align the sphere centers with the neutral surface, the same measured length L should be obtained in each case.

In an embodiment, a temperature sensor 780 is attached to a length artifact 700. The temperature sensor, which might be a thermistor, for example, obtains an electrical signal that it sends to electronics 782 that uses the received signal to determine a temperature. The electrical signals may be sent to the electronics by over wires or wirelessly. In an initial step, the reference length of the artifact is determined using a laser tracker having a calibrated distance meter. The reference temperature $T_{REF}$ of the artifact is recorded at the time of this measurement. Later the length of the artifact is measured with a 3D instrument to evaluate the accuracy of the instrument with the artifact having a test temperature $T_{TEST}$. The length of the artifact is corrected by an amount $L*(T_{EST}-T_{REF})*CTE$ to account for the difference in temperatures.

Figure 8:
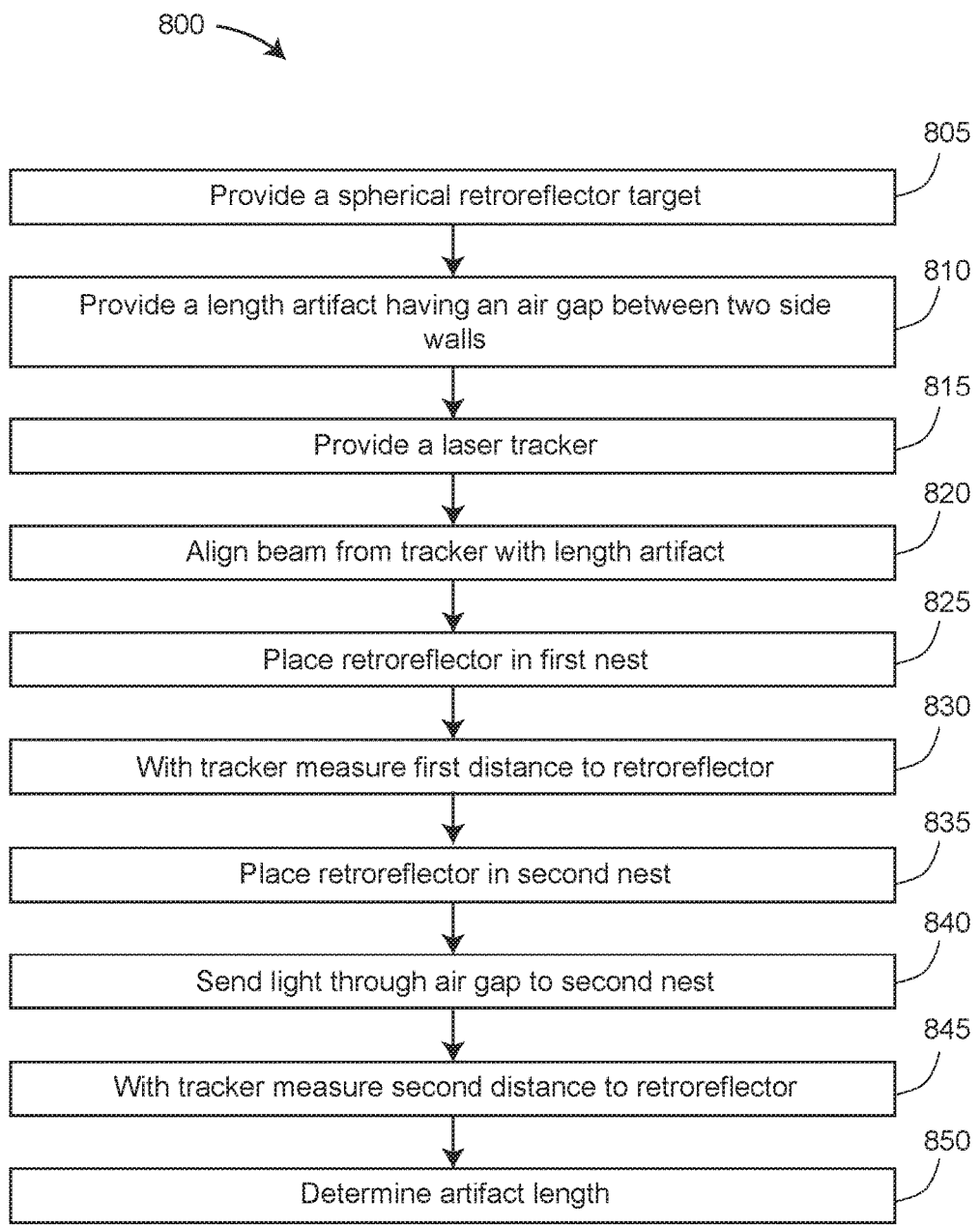
FIG. 8 is a flowchart of a method of determining a length of a length artifact according to an embodiment.

In a method 800 described in FIG. 8, a laser tracker is used to determine a length of an artifact. A step 805 is providing a spherical retroreflector target, which might be an SMR, for example. The retroreflector includes a spherical portion that has a sphere center. A step 810 is providing a length artifact. The length artifact has a first side wall, a second side wall, and a base portion. The base portion includes a first nest and a second nest configured to accept the spherical retroreflector, with the retroreflector center at the first nest and the second being the first nest center and the second nest center, respectively. A step 815 is providing a laser tracker configured to project light to the retroreflector target, track the retroreflector target, and measure 3D coordinates of the center of the retroreflector target.

A step 820 is aligning the laser tracker to the length artifact so that the beam of light from the tracker travels in a straight line along a path connecting the first nest center and the second nest center. A step 825 is placing the retroreflector target in the first nest, which is taken here to be the nest closer to the tracker. It should be understood that the steps in the method 800 do not have to be carried out in the order given, which means that order of measuring the near and far nests may be reversed. A step 830 is measuring with the laser tracker a first distance to the first nest center. A step 835 is placing the retroreflector target in the second nest. A step 840 is sending the beam of light through the air gap between the first side wall and the second side wall to the retroreflector target. An example of a way of placing the retroreflector target in the second nest is now given. While tracking the retroreflector with the beam of light, the retroreflector is moved from the first nest over the top of the length artifact and then placed into the second nest. The beam of light passes through the air gap to the retroreflector. A step 840 is measuring with the laser tracker a second distance to the second nest center. A step 845 is determining a first artifact length based at least in part on the first distance and the second distance.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A length artifact having an artifact frame of reference, the length artifact comprising:
a first side wall and a second side wall separated by an air gap; and
a base portion in contact with the first side wall and the second side wall, the base portion having a first platform region and a second platform region, the first platform region including a first nest sized and shaped to receive a spherical surface of a retroreflector target, the spherical surface having a sphere center, the second platform region including a second nest sized and shaped to receive the spherical surface of the retroreflector target,
the length artifact further including a first nest center and a second nest center, the first nest center being first three-dimensional (3D) coordinates in the artifact frame of reference of the sphere center when the retroreflector target is placed in the first nest, the second nest center being second 3D coordinates in the artifact frame of reference of the sphere center when the retroreflector target is placed in the second nest,
the length artifact further having a neutral surface in the artifact frame of reference, the neutral surface being a surface above which the length artifact is in tension and below which the length artifact is in compression.

2. The length artifact of claim 1, wherein the first nest center and the second nest center lie on the neutral surface.

3. The length artifact of claim 1, wherein the base portion, the first side wall, and the second side wall are formed of a first material.

4. The length artifact of claim 3, wherein the first material is selected from the group consisting of Invar and Super Invar.

5. The length artifact of claim 1, wherein the first nest includes a first plurality of contact points and a first magnet and the second nest includes a second plurality of contact points and a second magnet, the first plurality of contact points configured to make contact with the spherical surface when the retroreflector target is placed in the first nest, the second plurality of contact points configured to make contact with the spherical surface when the retroreflector target is placed in the second nest, the first magnet configured to pull the retroreflector target toward the first platform region when the retroreflector target is placed in the first nest, the second magnet configured to pull the retroreflector target toward the second platform region when the retroreflector target is placed in the second nest.

6. The length artifact of claim 1, further including a mount configured for attachment to the base portion.

7. The length artifact of claim 6, wherein the mount is attached to base portion with at least one screw.

8. The length artifact of claim 6, wherein the mount is configured to screw onto an instrument stand.

9. The length artifact of claim 1, further including a temperature sensor in contact with a surface of the length artifact, the temperature sensor configured to transmit an electrical signal indicative of a temperature of the length artifact.

10. A method of calibrating a length artifact, the method comprising:
providing a retroreflector target configured to retroreflect a beam of light, the retroreflector target having a spherical portion that includes a sphere center;
providing the length artifact having a first side wall, a second side wall, and a base portion, the first side wall and the second side wall separated by an air gap, the first side wall and the second side wall in contact with the base portion, the base portion including a first nest and a second nest, the first nest sized and shaped to receive the spherical portion when the sphere center is at a first nest center, the second nest sized and shaped to receive the spherical portion when the sphere center is at a second nest center;
providing a laser tracker configured to project a beam of light to the retroreflector target, and to determine three-dimensional (3D) coordinates of the retroreflector target, the 3D coordinates based at least in part on a distance from the laser tracker to the retroreflector target;
aligning the laser tracker to the length artifact so that the beam of light travels in a straight line along a path connecting the first nest center and the second nest center;
placing the retroreflector target in the first nest;
sending the beam of light to the retroreflector target;
measuring with the laser tracker a first distance to the first nest center;
placing the retroreflector target in the second nest;
sending the beam of light through the air gap to the retroreflector target;
measuring with the laser tracker a second distance to the second nest center; and
determining a first artifact length based at least in part on the first distance and the second distance.

11. The method of claim 10, further comprising:
setting a reference length for the length artifact equal to the first artifact length;
providing a 3D instrument capable of measuring 3D coordinates of the first nest center and the second nest center;
measuring with the 3D instrument third 3D coordinates of the first nest center;

measuring with the 3D instrument fourth 3D coordinates of the second nest center;

determining a test length based at least in part on the third 3D coordinates and the fourth 3D coordinates; and determining a 3D instrument error based at least in part on the test length and the reference length.

12. The method of claim 11, wherein:

the method further includes providing a coefficient of thermal expansion (CTE) of the length artifact;

the step of providing the length artifact further includes providing a temperature sensor attached to the length artifact, the temperature sensor configured to transmit an electrical signal indicative of a test temperature of the length artifact;

the method further includes receiving the electrical signal and determining the test temperature based at least in part on the electrical signal; and in the step of determining the first artifact length, the first artifact length further depends on the test temperature.

13. The method of claim 10, wherein:

in the step of providing a laser tracker, the distance meter is an interferometer; and in the step of placing the retroreflector target in the second nest, the laser tracker tracks the retroreflector target as it is moved from the first nest.

* * * * *